United States Patent
Tracy et al.

(10) Patent No.: US 12,551,974 B2
(45) Date of Patent: Feb. 17, 2026

(54) ADAPTIVE COMPONENT OVERHAUL USING STRUCTURED LIGHT SCAN DATA

(71) Applicant: Pratt & Whitney Canada Corp., Longueuil (CA)

(72) Inventors: Kevin M. Tracy, Wichita Falls, TX (US); Charles Trent Daulton, Burkburnett, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 146 days.

(21) Appl. No.: 17/942,050

(22) Filed: Sep. 9, 2022

(65) Prior Publication Data

US 2024/0082962 A1    Mar. 14, 2024

(51) Int. Cl.
 B23K 31/12    (2006.01)
 B33Y 50/00    (2015.01)

(52) U.S. Cl.
 CPC .............. *B23K 31/12* (2013.01); *B33Y 50/00* (2014.12)

(58) Field of Classification Search
 None
 See application file for complete search history.

(56) References Cited

U.S. PATENT DOCUMENTS

| | | |
|---|---|---|
| 8,140,179 B2 | 3/2012 | Drechsler |
| 8,910,361 B2 | 12/2014 | Rickenbacher |
| 9,174,312 B2 | 11/2015 | Baughman |
| 9,505,172 B2 | 11/2016 | Ljungblad |
| 9,764,517 B2 | 9/2017 | Potter |
| 9,902,024 B2 | 2/2018 | Ernst |
| 10,174,414 B2 | 1/2019 | Lin et al. |
| 10,814,439 B2 | 10/2020 | Ozturk |
| 11,097,350 B2 | 8/2021 | Twelves, Jr. |
| 11,285,538 B2 | 3/2022 | Shi |
| 11,305,353 B2 | 4/2022 | Geisen |
| 12,115,598 B2 * | 10/2024 | Tracy ...................... F01D 5/005 |
| 12,358,232 B2 * | 7/2025 | Tracy ...................... B23K 1/20 |

(Continued)

FOREIGN PATENT DOCUMENTS

| | | |
|---|---|---|
| EP | 3933527 A1 | 1/2022 |
| JP | 2009025119 A | 2/2009 |
| WO | 2019177607 A1 | 9/2019 |

OTHER PUBLICATIONS

Borovkov et al., Directed Energy Deposition Processes, Journal of Manufacturing and Materials Processing, vol. 5, issue 85, 2021 (Year: 2021).*

(Continued)

*Primary Examiner* — Devang R Patel
(74) *Attorney, Agent, or Firm* — Getz Balich LLC

(57) ABSTRACT

A method of overhaul is provided. During this overhaul method, a substrate is scanned using structured light to provide substrate scan data. The substrate is from a component previously installed within an engine. The substrate scan data is compared to substrate reference data to provide additive manufacturing data. Material is deposited with the substrate using an additive manufacturing device based on the substrate scan data to provide a first object. The first object is scanned using the structured light to provide first object scan data. The first object scan data is compared to first object reference data to provide machining data. The first object is machined using the machining data.

20 Claims, 5 Drawing Sheets

(56) References Cited

U.S. PATENT DOCUMENTS

| | | |
|---|---|---|
| 2006/0067830 A1 | 3/2006 | Guo |
| 2008/0173624 A1 | 7/2008 | Drechsler |
| 2009/0026182 A1 | 1/2009 | Hu |
| 2012/0179285 A1 | 7/2012 | Melzer-Jokisch |
| 2015/0217415 A1 | 8/2015 | Andolfi |
| 2018/0243866 A1 | 8/2018 | Srinivasan |
| 2019/0299290 A1 | 10/2019 | Kuhns et al. |
| 2019/0366491 A1 | 12/2019 | Ozturk |
| 2020/0290123 A1 | 9/2020 | Anton |
| 2021/0069832 A1 | 3/2021 | Burbaum |
| 2021/0299802 A1 | 9/2021 | Shin |
| 2022/0212396 A1 | 7/2022 | Tardif |
| 2022/0212397 A1 | 7/2022 | Edy |

OTHER PUBLICATIONS

Rajaguru et al., Additive manufacturing—State of art, Materials Today: Proceedings 21, Aug. 2019, p. 628-633. (Year: 2019).*
EP search report for EP23196377.8 dated Oct. 25, 2023.

* cited by examiner

ADAPTIVE COMPONENT OVERHAUL USING STRUCTURED LIGHT SCAN DATA

TECHNICAL FIELD

This disclosure relates generally to overhauling a component using additive manufacturing.

BACKGROUND INFORMATION

Defects in a component may be overhauled using braze material or weld filler. Various processes are known in the art for applying braze material and for welding filler material to a component. While these known processes have various advantages, there is still room in the art for improvement. In particular, there is a need in the art for overhaul processes which can reduce material waste and/or manufacturing costs.

SUMMARY

According to an aspect of the present disclosure, a method of overhaul is provided. During this overhaul method, a substrate is scanned using structured light to provide substrate scan data. The substrate is from a component previously installed within an engine. The substrate scan data is compared to substrate reference data to provide additive manufacturing data. Material is deposited with the substrate using an additive manufacturing device based on the substrate scan data to provide a first object. The first object is scanned using the structured light to provide first object scan data. The first object scan data is compared to first object reference data to provide machining data. The first object is machined using the machining data.

According to another aspect of the present disclosure, another method is provided during which a substrate is scanned using structured light to provide substrate scan data. The substrate scan data is compared to substrate reference data to provide additive manufacturing data. Material is deposited with the substrate using an additive manufacturing device based on the additive manufacturing data to provide a first object. The first object is scanned using structured light to provide first object scan data. The first object scan data is compared to the substrate scan data to provide machining data. The first object is machined using the machining data.

According to still another aspect of the present disclosure, a system is provided for overhauling a component. This overhaul system includes a scanning device, an additive manufacturing device, a machining device and a controller. The scanning device is configured to scan a substrate using structured light and to provide substrate scan data indicative of one or more characteristics of the substrate. The scanning device is also configured to scan a first object using the structured light and to provide first object scan data indicative of one or more characteristics of the first object. The additive manufacturing device is configured to deposit material onto the substrate to provide the first object based on additive manufacturing data. The machining device is configured to remove material from the first object based on machining data. The controller is configured to compare the substrate scan data with substrate reference data to provide the additive manufacturing data. The controller is also configured to compare the first object scan data to the substrate scan data to provide the machining data.

The structured light may be structured white light or structured blue light.

The substrate may be from a component previously installed within a gas turbine engine.

The additive manufacturing device may be configured as or otherwise include a direct metal deposition device.

The structured light may be structured white light.

The structured light may be structured blue light.

The substrate reference data may be or otherwise include data from a design specification for the component.

The first object reference data may be or otherwise include the substrate scan data.

The depositing of the material may fill a void in the substrate.

The depositing of the material may form a cladding over a surface of the substrate.

The method may also include removing a coating from the substrate to expose a surface of the substrate. The material may be deposited with the substrate after the removing of the coating.

The additive manufacturing device may be configured as or otherwise include a laser metal deposition device.

The machining may remove some of the material deposited with the substrate during the depositing of the material.

The substrate may be configured from or otherwise include substrate material. The machining may remove some of the substrate material.

The machining may be or otherwise include milling the first object.

The machining may be or otherwise include polishing the first object.

The method may also include coating a surface of a second object. The second object may be formed by the machining of the first object.

The engine may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes systems and methods for adaptively overhauling (e.g., repairing) a component. This overhauling may restore one or more features of a previously formed component to brand new condition, similar to brand new condition or better than brand new condition. The component, for example, may be overhauled to fix one or more defects (e.g., cracks, wear and/or other damage) imparted during previous use of the component; e.g., when installed within an engine. The component may also or alternatively be overhauled to fix one or more defects imparted during an initial formation of the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the overhaul systems and methods may be described below with respect to overhauling a gas turbine engine component such as a turbine vane or other stators within the turbine section.

The component may be included in various gas turbine engines. The component, for example, may be included in a geared gas turbine engine where a gear train connects one or more shafts to one or more rotors in a fan section, a compressor section and/or any other engine section. Alternatively, the component may be included in a direct-drive gas turbine engine configured without a gear train. The component may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the overhaul systems and methods of the present disclosure may alternatively be used to overhaul component(s) for non-gas turbine engine applications; e.g., for reciprocating piston internal combustion engine applications, for rotary internal combustion engine applications, etc.

Figure 1:
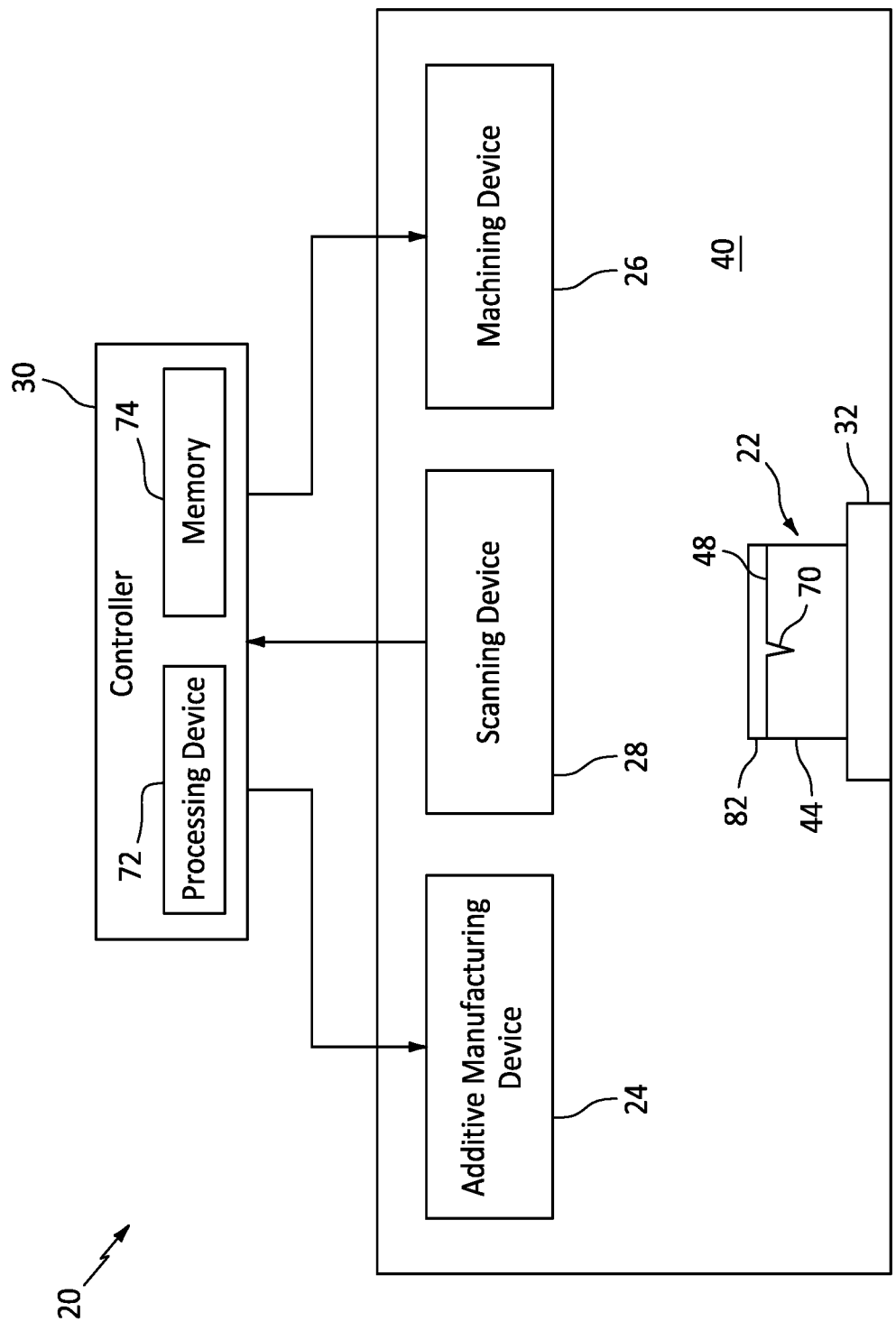
FIG. 1 is a schematic illustration of a system for overhauling a component.

FIG. 1 schematically illustrates an exemplary system 20 for overhauling the component 22. This overhaul system 20 includes an automated additive manufacturing (AM) device 24 (e.g., a three-dimensional (3D) printer), an automated machining device 26 (e.g., a computer numerical control (CNC) machining device) and a scanning device 28. The overhaul system 20 of FIG. 1 also includes a controller 30 in signal communication (e.g., hardwired and/or wirelessly coupled) with one or more or all of the other overhaul system components 24, 26 and 28.

Figure 2:
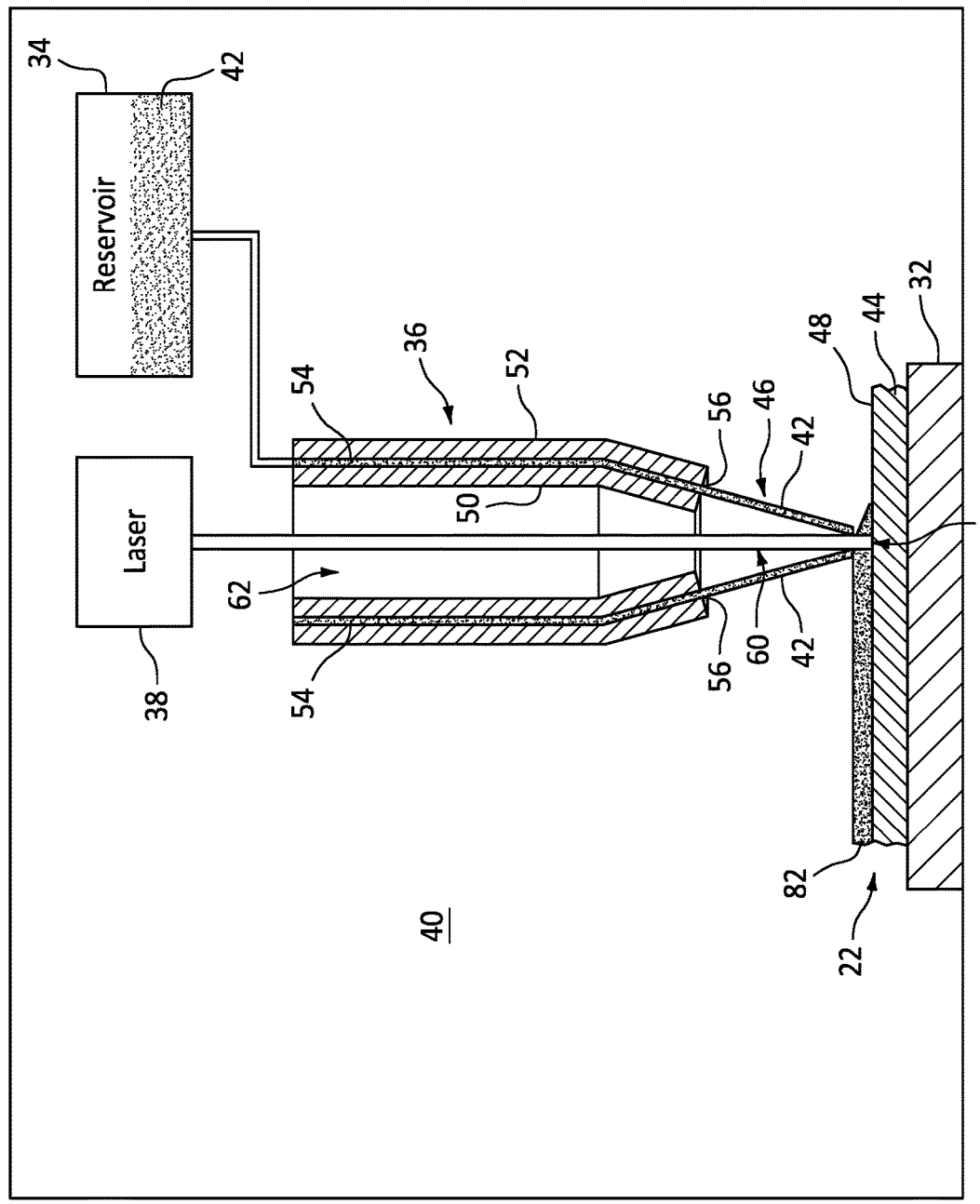
FIG. 2 is a schematic illustration of an additive manufacturing device.

Referring to FIG. 2, the additive manufacturing device 24 may be configured as a direct metal deposition (DMD) device such as, but not limited to, a laser metal deposition (LMD) device. The additive manufacturing device 24 of FIG. 2, for example, includes a component support 32, a material reservoir 34, a nozzle 36 and a laser 38.

The component support 32 is disposed within an internal chamber 40 of the overhaul system 20. This component support 32 is configured to support the component 22 within the internal chamber 40; e.g., a build chamber. The component 22, for example, may be placed on top of the component support 32. The component 22 may also or alternatively be mounted to the component support 32 via a fixture, which fixture may arrange the component 22 in a fixed position and/or in a known spatial orientation within the chamber 40.

The material reservoir 34 is configured to store a quantity of additive manufacturing (AM) powder 42 formed of additive manufacturing (AM) material. This material reservoir 34 is also configured to supply the additive manufacturing powder 42 to the nozzle 36 during additive manufacturing device operation. Examples of the material reservoir 34 include, but are not limited to, a tank, a hopper and a bin.

The nozzle 36 is configured to deliver the additive manufacturing powder 42 received from the material reservoir 34 to a substrate 44 of the component 22 during additive manufacturing device operation. More particularly, the nozzle 36 is configured to direct a (e.g., annular, conical) stream 46 of the additive manufacturing powder 42 toward (e.g., to) a surface 48 of the substrate 44. The nozzle 36 of FIG. 2, for example, includes a tubular inner sidewall 50 and a tubular outer sidewall 52. The outer sidewall 52 extends axially along and circumscribes the inner sidewall 50 so as to form a passage 54 (e.g., an annulus) between the inner sidewall 50 and the outer sidewall 52. This passage 54 is fluidly coupled with an outlet from the material reservoir 34, and the passage 54 extends axially within the nozzle 36 to a (e.g., annular) nozzle orifice 56. A distal end portion of the nozzle 36 and its inner sidewall 50 and its outer sidewall 52 may radially taper inwards as the nozzle 36 extends axially towards (e.g., to) the nozzle orifice 56. With such an arrangement, the nozzle 36 may focus the additive manufacturing powder 42 to, around or about a target point 58 on, slightly above or slightly below the substrate surface 48. However, in alternative embodiments, the nozzle 36 may be configured to deliver the additive manufacturing powder 42 through an internal bore rather than an annulus.

The laser 38 is configured to generate a laser beam 60 for melting the additive manufacturing powder 42 delivered by the nozzle 36 in a melt pool to fuse (e.g., weld) the additive manufacturing material to the substrate 44. The laser 38 of FIG. 2 is configured to direct the laser beam 60 to or about the target point 58, where the laser beam 60 may be incident with and is operable to heat up and melt the additive manufacturing powder 42. The laser beam 60 of FIG. 2 is directed through an (e.g., central) internal bore 62 of the nozzle 36, which internal nozzle bore 62 may be formed by the inner sidewall 50. However, in other embodiments, the laser 38 may be configured to direct the laser beam 60 outside of the nozzle 36 or along another path through the nozzle 36.

While the additive manufacturing device 24 is described above with respect to the arrangement of FIG. 2, the present disclosure is not limited to such an exemplary additive manufacturing device arrangement or type. It is contemplated, for example, the additive manufacturing device 24 may alternatively be configured as or otherwise include: an energy (e.g., laser or electron) beam powder bed fusion (PBF) device; a stereolithography (SLA) device; a direct selective laser sintering (DSLS) device; an electron beam sintering (EBS) device; an electron beam melting (EBM) device; a laser engineered net shaping (LENS) device; a laser net shape manufacturing (LNSM) device; a direct metal laser sintering (DMLS) device, a powder bed device (e.g., a selective laser melting (SLM) device, a laser cusing device, a Hoganas digital metal device, etc.), a powder fed device (e.g., a laser cladding device, a direct energy deposition (DED) device, a laser metal deposition (LIVID) device, etc.) or any other type of additive manufacturing device.

Figure 3:
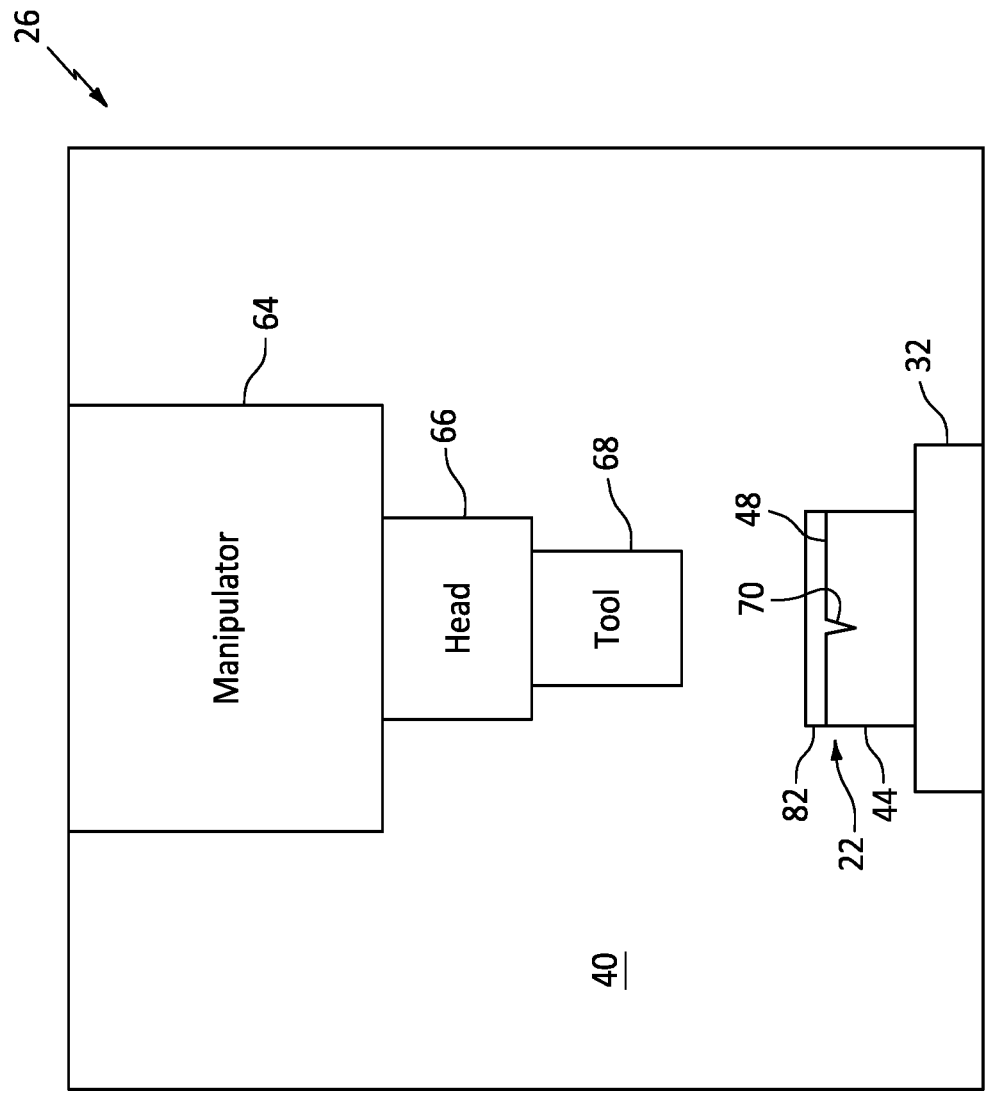
FIG. 3 is a schematic illustration of a machining device.

Referring to FIG. 3, the machining device 26 includes a manipulator 64, a head 66 and at least one machining tool 68 mated with the head 66. The machining device 26 of FIG. 3 also includes the component support 32. The manipulator 64 is configured to move the head 66 and the machining tool 68 within the internal chamber 40 relative to the component 22. The manipulator 64, for example, may be a multi-axis (e.g., 3-axis, 5-axis, 7-axis, etc.) manipulator such as, but not limited to, a robotic arm and/or a gantry system. The head 66 is configured to hold the machining tool 68. The head 66 is also configured to facilitate actuation of the machining tool 68; e.g., rotate the machining tool 68 about an axis. The machining tool 68 is configured to machine the component 22; e.g., remove material from the component 22. Examples of the machining tool 68 include, but are not limited to, a drill bit, a milling bit, a milling cutter, a grinding bit, a sanding bit and a polishing bit. In another example, the machining tool 68 may be a lathe bit where, for example, the component 22 is moved (e.g., rotated) relative to the machining tool 68. The present disclosure, however, is not limited to such an exemplary machining device with one or more machining tools; e.g., rotatable bits. For example, in other embodiments, the machining device 26 may also or alternatively include a laser to laser machine the component 22 within the internal chamber 40 and/or an electrical discharge machining (EDM) device to machine the component 22 within the internal chamber 40.

Referring to FIG. 1, the additive manufacturing device 24 and the machining device 26 are described above as operating on the component 22 in a common internal chamber 40 of the overhaul system 20. However, in other embodiments, the additive manufacturing device 24 may have and operate in an internal build chamber of the additive manufacturing device 24, and the machining device 26 may have and separately operate in an internal machining chamber of the machining device 26. For example, the internal chamber 40 of FIG. 2 may be separate and distinct from the internal chamber 40 of FIG. 3. In such embodiments, the additive manufacturing device 24 and the machining device 26 may each include its own discrete component support 32.

The scanning device 28 of FIG. 1 is configured to map a surface geometry of, one or more dimensions of and/or one or more spatial coordinates for a portion (or multiple portions) of or an entirety of an exterior of the component 22. Briefly, the term "map" may describe a process of determining (e.g., measuring) and collecting certain information. The scanning device 28 may also be configured to map a geometry of, one or more dimensions of and/or one or more spatial coordinates for a feature (or multiple features) projecting into the component 22; e.g., an opening to a void 70 such as, but not limited to, a crack, a fracture, a slice, a gouge, a dimple, etc. The scanning device 28 of FIG. 1, in particular, is configured as a structured light scanning device; e.g., a structured white light scanning device or a structured blue light scanning device. This scanning device 28 is configured to project a pattern of light (e.g., structured white light, structured blue light) onto the component 22 using one or more light projectors, which pattern of light may be formed by white light (e.g., with a wavelength between 400-700 nm) or blue light (e.g., with a wavelength between 450-495 nm). The scanning device 28 is configured to pick up (e.g., image, capture, detect, etc.) distortions in the pattern of light against the exterior of the component 22 using one or more imaging devices; e.g., cameras. The scanning device 28 is further configured to map the component 22 based on the distortions in the pattern of light.

The controller 30 may be implemented with a combination of hardware and software. The hardware may include at least one processing device 72 and a memory 74, which processing device 72 may include one or more single-core and/or multi-core processors. The hardware may also or alternatively include analog and/or digital circuitry other than that described above.

The memory 74 is configured to store software (e.g., program instructions) for execution by the processing device 72, which software execution may control and/or facilitate performance of one or more operations such as those described below. The memory 74 may be a non-transitory computer readable medium. For example, the memory 74 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
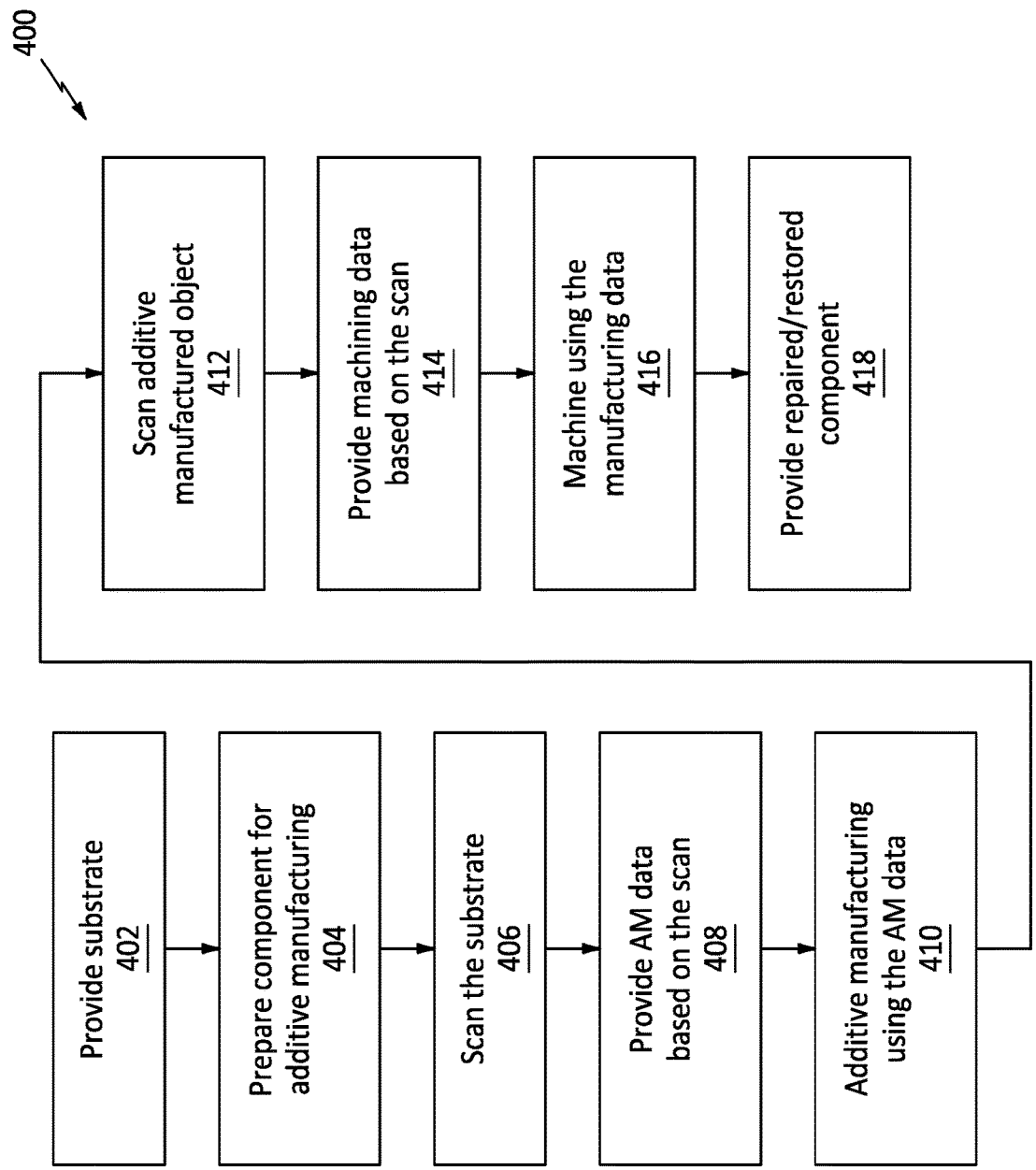
FIG. 4 is a flow diagram of an adaptive method for overhauling the component.

FIG. 4 is a flow diagram of an exemplary adaptive method 400 for overhauling a component; e.g., a previously installed/used engine component. For ease of description, the overhaul method 400 is described with respect to the overhaul system 20 overhauling the component 22. The overhaul method 400, however, is not limited to any particular overhaul system types or configurations. Furthermore, some or all of the method steps may alternatively be performed to form a new component.

Figure 5:
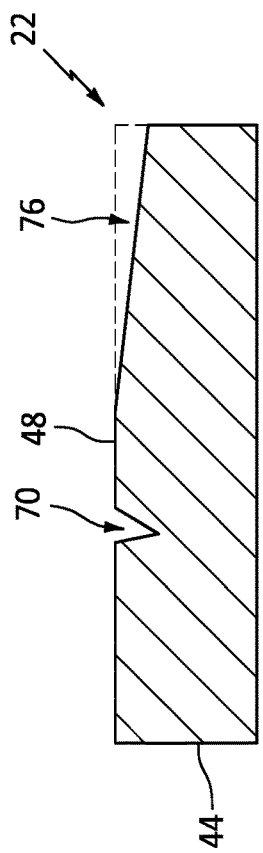
FIGS. 5-9 are partial sectional illustrations of the component during various steps of the overhaul method.

In step 402, referring to FIG. 5, the substrate 44 is provided. For ease of description, this substrate 44 is described as part of a damaged component. For example, the component 22 of FIG. 5 includes at least one void 70 such as, but not limited to, a crack, a fracture, a slice, a gouge, a dimple, etc. This void 70 projects partially into the component 22 and its substrate 44 from the exterior of the component 22. The component 22 of FIG. 5 also include a wear region 76 where a portion of the component 22 and its substrate 44 has been worn away due to, for example, erosion, rubbing and/or otherwise. Of course, in other embodiments, the component 22 may include multiple voids 70, multiple wear regions 76, the void(s) 70 without any wear region, the wear region(s) 76 without any void, and/or one or more other substrate defects.

Figure 6:
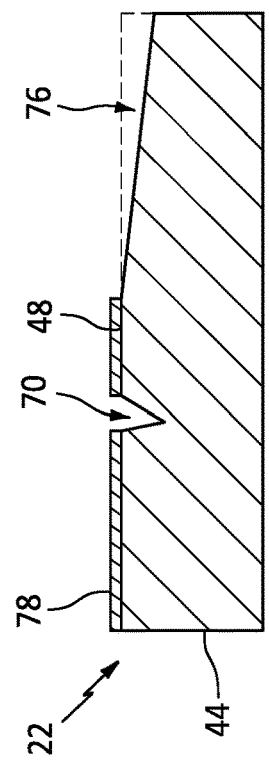

In step 404, referring to FIG. 6, the component 22 is prepared for the additive manufacturing material. A coating 78 (see FIG. 5) over at least a portion or an entirety of the substrate 44, for example, may be removed to expose the underlying substrate 44 and its substrate surface 48. The coating 78 may be removed using various techniques such as, but not limited to, chemical stripping, blasting and/or machining. In addition or alternatively, the void 70 may be machined (e.g., enlarged, smoothed, etc.), cleaned out and/or otherwise processed. This preparation step 404 may be performed by the machining device 26 and/or other devices part of or discrete from the overhaul system 20.

In step 406, the substrate 44 is scanned using structured light; e.g., structured white or blue light. The scanning device 28 of FIG. 1, for example, scans the substrate 44 of FIG. 6 to map one or more exterior characteristics of the substrate 44 and/or one or more interior characteristic of the substrate 44. Examples of the exterior substrate characteristics include, but are not limited to, a surface geometry of, one or more dimensions of and/or one or more spatial coordinates for a portion (or multiple portions) of or an entirety of an exterior of the substrate 44. Examples of the interior substrate characteristics include, but are not limited to, a geometry of, one or more dimensions of and/or one or more spatial coordinates for a feature (or multiple features) projecting into the substrate 44; e.g., the opening to the void 70. The scanning device 28 then provides substrate scan data to the controller 30 indicative of the one or more mapped substrate characteristics. The scan data may be in the form of a computer aided design (CAD) model file; e.g., a stereolithography (STL) model file.

In step 408, the substrate scan data is processed to provide additive manufacturing (AM) data. The controller 30 of FIG. 1, for example, may compare (e.g., align) the one or more mapped substrate characteristics from the substrate scan data with respective characteristics from substrate reference data. This substrate reference data may be data input from (or derived from) a (e.g., original equipment manufacturer (OEM)) design specification for the component 22. In other words, the controller 30 may compare the one or more mapped characteristics for the substrate 44 being worked on (e.g., overhauled) to one or more corresponding characteristics of a (e.g., theoretical) design space component; e.g., a component formed according to the design specification. The controller 30, for example, may generate a solid model of the scanned substrate 44 to compare to a solid model of the design space component. The controller 30 may thereby evaluate the current state/condition of the substrate 44, and determine what additive operations may be performed (e.g., amounts of additive manufacturing material to be deposited, where to deposit the additive manufacturing material, path(s) to follow for the depositing of the additive manufacturing material, etc.) to place the substrate 44 of FIG. 6 into like new (or new) condition; e.g., to have the same (or similar) characteristics as the design space component. For example, the controller 30 may identify material deficits between the solid model of the scanned substrate 44 and the solid model of the design space component, and determine how to fill those material deficits with the additive manufacturing material. The additive manufacturing data may include one or more commands for the additive manufacturing device 24 to place the substrate 44 of FIG. 6 into the like new (or new) condition.

Figure 7:
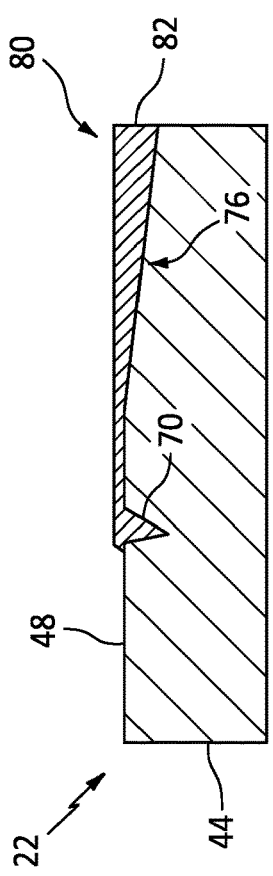

In step 410, referring to FIG. 7, a first object 80 is additive manufactured. The additive manufacturing device 24, for example, deposits the additive manufacturing material with (e.g., onto) the substrate 44 to form the first object 80. This additive manufacturing material is deposited based on/according to the additive manufacturing data; e.g., command(s) provided by the controller 30. The additive manufacturing material may thereby be selectively deposited to at least partially restore or otherwise place the component 22 and its substrate 44 close to the like new (or new) condition.

During the additive manufacturing, referring to FIG. 2, the additive manufacturing device 24 may dispose the additive manufacturing powder 42 onto the substrate surface 48 at or about the target point 58. The laser 38 may concurrently melt and fuse this additive manufacturing powder 42 at the target point 58 together and/or to the underlying substrate 44. Referring to FIGS. 2 and 7, the additive manufacturing device 24 may be positioned and operated to provide the fused additive manufacturing material 82 within the void 70; e.g., to partially or completely fill the void 70. The additive manufacturing device 24 may also or alternatively be positioned and operated to provide a cladding (e.g., a layer or multiple layers) of the fused additive manufacturing material 82 over the wear region 76; e.g., to build back worn away substrate material. The additive manufacturing device 24 may selectively deposit the additive manufacturing material over the substrate 44 such that (e.g., only) areas which need repair (and optionally areas adjacent and/or surrounding those areas) are filled with the fused additive manufacturing material 82 and/or coated with the fused additive manufacturing material 82. Of course, in other embodiments, the additive manufacturing material may be deposited over an entirety of the substrate 44 where excess material may later be removed. The additive manufacturing material may be deposited (e.g., built up) as one or more layers during the step 410.

Following the additive manufacturing step 410, the fused additive manufacturing material 82 of FIG. 7 may heal the void 70. The fused additive manufacturing material 82, for example, may partially or completely fill the void 70. The fused additive manufacturing material 82 may also or alternatively provide a cladding over the substrate 44 to substantially restore a dimensional parameter of and/or reinforce the wear region 76 and/or other regions. The fused additive manufacturing material 82, for example, may buildup the wear region 76 back to or above a dimensional parameter specified therefor by the design specification (or a overhaul specification) for the component 22.

The additive manufacturing material may be or otherwise include metal such as, but not limited to, an aluminum (Al) superalloy, a nickel (Ni) superalloy or a titanium (Ti) superalloy. This additive manufacturing material may be selected to have one or more common (e.g., the same) or similar properties to material forming the underlying substrate 44. The additive manufacturing material and the substrate material, for example, may be a common material; e.g., metal alloy. Of course, in other embodiments, the additive manufacturing material may be different than, but have similar material properties as, the substrate material.

In step 412, the first object 80 (e.g., the substrate 44 with the fused additive manufacturing material 82) is scanned using structured light; e.g., structured white or blue light. The scanning device 28 of FIG. 1, for example, scans the first object 80 of FIG. 7 to map one or more exterior characteristics of the first object 80 and/or one or more interior characteristic of the first object 80. Examples of the exterior first object characteristics include, but are not limited to, a surface geometry of, one or more dimensions of and/or one or more spatial coordinates for a portion (or multiple portions) of or an entirety of an exterior of the first object 80. Examples of the interior first object characteristics include, but are not limited to, a geometry of, one or more dimensions of and/or one or more spatial coordinates for a feature (or multiple features) projecting into the first object 80; e.g., a void. The scanning device 28 then provides first object scan data to the controller 30 indicative of the one or more mapped first object characteristics. The scan data may be in the form of a computer aided design (CAD) model file; e.g., a stereolithography (STL) model file.

In step 414, the first object scan data is processed to provide machining data. The controller 30 of FIG. 1, for example, may compare (e.g., align) the one or more mapped first object characteristics from the first object scan data with one or more respective mapped substrate characteristics from the substrate scan data; e.g., the pre-additive manufacturing scan data. The controller 30 may also or alternatively compare (e.g., align) the one or more mapped first object characteristics from the first object scan data with respective characteristics from other first object reference data. This other first object reference data may be data input from (or derived from) the design specification for the component 22. The controller 30 may thereby evaluate the current state/condition of the first object 80, and determine what subtractive operations may be performed (e.g., amounts of material to be removed, where to remove the material, path(s) for the machining tool 68 to follow, etc.) to place the first object 80 of FIG. 7 into like new (or new) condition; e.g., to have the same (or similar) characteristics as the design space component. The additive manufacturing data may include one or more commands for the machining device 26 to place the first object 80 of FIG. 7 into the like new (or new) condition.

In addition to providing the machining data, the first object scan data may be used for inspecting the first object 80; e.g., the adaptive overhaul. The controller 30 may compare a point cloud of both the substrate scan data and the first object scan data to the required additive deposition. The point cloud may relate the dimensional requirements to the first object reference data and geometrical surfaces to one or more unique surfaces of the substrate data. The scanning device 28 may use unique, non-repaired features of the component 22 to align all three point clouds for comparison. For example, the scanning device 28 may use a non-repaired diameter as a datum circle, a non-repaired face as a datum plane, and third feature (e.g., a slot) as a final datum for rotational alignment.

Figure 8:
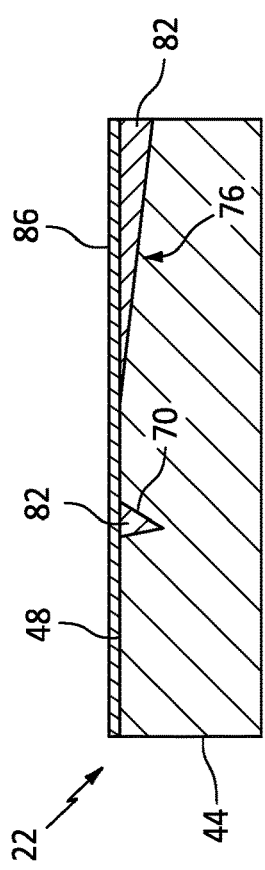

In step 416, referring to FIG. 8, a second object 84 is formed. The machining device 26 of FIG. 3, for example, selectively removes material from the first object 80 to form the second object 84. This first object material is removed based on/according to the machining data; e.g., command(s) provided by the controller 30. The first object material may thereby be selectively removed to at least partially restore or otherwise place the component 22 into the like new (or new) condition. The material removed from the first object 80 may include some of the fused additive manufacturing material 82 and/or some of the substrate material. This material may be removed by the machining device 26 through drilling, cutting, grinding, milling, polishing, sanding and/or otherwise.

Figure 9:
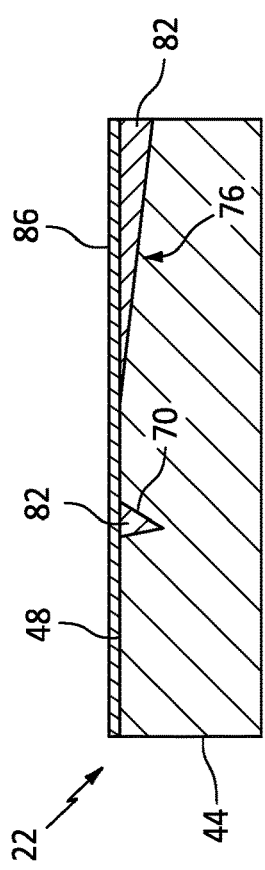

In step 418, referring to FIG. 9, the second object 84 may be processed to provide a overhauled/restored component. One or more coatings 86, for example, may be applied to the second object 84 (see FIG. 8). Examples of these coatings 86 include, but are not limited to, bond coating(s), environmental coating(s), thermal barrier coating(s), etc.

The adaptive overhaul method 400 may utilize the structured light scanning to reduce manufacturing time, manufacturing waste and/or manufacturing costs. For example, when a component is worn or otherwise in need of repair, refurbishing, etc., that component may have unique defects; e.g., voids, wear regions, etc. Therefore, rather than using a standard (e.g., one-size-fits-all) patch or overhaul protocol, the structured light scanning may be utilized to specifically tailor the material deposition via the additive manufacturing device 24. In addition or alternatively, while the additive manufacturing device 24 may have relatively tight tolerances, there may be slight variation from component to component following an additive manufacturing material deposition step. Therefore, the structured light scanning may be utilized to specifically tailor the material removal via the machining device 26.

In some embodiments, referring to FIG. 2, the additive manufacturing powder 42 and the laser beam 60 may be concurrently directed to the common target point 58 for the additive manufacturing material deposition. In other embodiments, however, the laser beam 60 may alternatively be directed to a different target point than the additive manufacturing powder 42. The laser beam target point, for example, may alternatively be spaced from and follow the additive manufacturing powder target point.

In some embodiments, the additive manufacturing powder 42 may be fused using the laser beam 60. The present disclosure, however, is not limited to use of such an exemplary energy beam. The additive manufacturing powder 42, for example, may alternatively be fused using an electron beam provided by an electron beam source. Furthermore, multiple energy beams (e.g., laser beams and/or electron beams) may be used for fusing the additive manufacturing powder 42. In addition or alternatively, multiple nozzles 36 may be used to deliver the additive manufacturing powder 42.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of overhaul, comprising:
scanning a substrate using structured light to provide substrate scan data, the substrate from a component previously installed within an engine;
comparing the substrate scan data to substrate reference data to provide additive manufacturing data;
depositing material with the substrate using an additive manufacturing device based on the substrate scan data to provide a first object;
scanning the first object using the structured light to provide first object scan data;
comparing the first object scan data to first object reference data to provide machining data and providing a non-repaired diameter of the first object as a datum circle, a non-repaired face of the first object as a datum plane and a geometric feature of the first object as a final datum for rotational alignment; and
machining the first object using the machining data;
wherein the depositing of the material forms a cladding over an upper surface of the substrate to reinforce a wear region of the component.

2. The method of claim 1, wherein the structured light comprises structured white light.

3. The method of claim 1, wherein the structured light comprises structured blue light.

4. The method of claim 1, wherein the substrate reference data comprises data from a design specification for the component.

5. The method of claim 1, wherein the first object reference data comprises the substrate scan data.

6. The method of claim 1, wherein the depositing of the material fills a void in the substrate.

7. The method of claim 1, further comprising:
removing a coating from the substrate to expose a surface of the substrate; and
wherein the material is deposited with the substrate after the removing of the coating.

8. The method of claim 1, wherein the additive manufacturing device comprises a laser metal deposition device.

9. The method of claim 1, wherein the machining removes some of the material deposited with the substrate during the depositing of the material.

10. The method of claim 1, wherein
the substrate comprises substrate material; and
the machining removes some of the substrate material.

11. The method of claim 1, wherein the machining comprises milling the first object.

12. The method of claim 1, wherein the machining comprises polishing the first object.

13. The method of claim 1, further comprising:
coating a surface of a second object;
wherein the second object is formed by the machining of the first object.

14. The method of claim 1, wherein the engine comprises a gas turbine engine.

15. A method, comprising:
scanning a substrate using structured light to provide substrate scan data;
comparing the substrate scan data to substrate reference data to provide additive manufacturing data;
depositing material with the substrate using an additive manufacturing device based on the additive manufacturing data to provide a first object;
scanning the first object using structured light to provide first object scan data;
comparing the first object scan data to the substrate scan data to provide machining data, and providing a non-repaired diameter of the substrate as a datum circle, a non-repaired face of the substrate as a datum plane and a geometric feature of the substrate as a final datum for rotational alignment; and
machining the first object using the machining data;
wherein the structured light is configured to project a pattern of white light onto the substrate, and the pattern of white light having a wavelength between 400-700 nm.

16. The method of claim 15, wherein the substrate is from a component previously installed within a gas turbine engine.

17. The method of claim 15, wherein the additive manufacturing device comprises a direct metal deposition device.

18. The method of claim 1, wherein the wear region comprises an interior surface of the substrate.

19. The method of claim 1, wherein the geometric features comprises a slot.

20. The method of claim 15, wherein the geometric feature comprises a recess.

* * * * *